United States Patent
Griffin et al.

(10) Patent No.: US 6,917,975 B2
(45) Date of Patent: Jul. 12, 2005

(54) METHOD FOR ROLE AND RESOURCE POLICY MANAGEMENT

(75) Inventors: Philip B. Griffin, Longmont, CO (US); Manish Devgan, Broomfield, CO (US); Alex Toussaint, Broomfield, CO (US); Rod McCauley, Loveland, CO (US)

(73) Assignee: BEA Systems, Inc., San Jose, CA (US)

( * ) Notice: Subject to any disclaimer, the term of this patent is extended or adjusted under 35 U.S.C. 154(b) by 0 days.

(21) Appl. No.: 10/367,462

(22) Filed: Feb. 14, 2003

(65) Prior Publication Data

US 2004/0162894 A1 Aug. 19, 2004

(51) Int. Cl.$^7$ .............................................. G06F 13/00
(52) U.S. Cl. ........................... 709/225; 709/229; 707/9; 707/10
(58) Field of Search ................................ 709/225, 229, 709/223, 226, 227; 707/9, 10; 713/104, 201

(56) References Cited

U.S. PATENT DOCUMENTS

| | | | |
|---|---|---|---|
| 5,369,702 A | | 11/1994 | Shanton ...................... 713/166 |
| 5,848,396 A | | 12/1998 | Gerace ......................... 705/10 |
| 5,911,143 A | * | 6/1999 | Deinhart et al. ......... 707/103 R |
| 6,014,666 A | * | 1/2000 | Helland et al. ................. 707/9 |
| 6,023,765 A | * | 2/2000 | Kuhn .......................... 713/200 |

(Continued)

OTHER PUBLICATIONS

Sundsted, Todd, "JNDI Overview, Part 1: An Introduction to Naming Services", JavaWorld, Jan. 2000. pp. 1–6, (download from: www.javaworld.com/javaworld/jw–01–2000/jw–01–howto_p.html.).

Moore, Bill, et al., "Migrating Weblogic Applications to WebSphere Advanced Edition", IBM Redbooks, Jan. 2001, pp. 1, 3–4, 109–111 and 181–195.

Barrett, Alexandra, "Trying Out Transactions", SunExpert Magazine, Jan. 1999, pp. 57–59.

Ayers, Danny, et al., Professional Java Server Programming, Wrox Press, Ltd., Birmingham, UK, Dec. 1999, pp. 515–545.

Ford, Nigel, Web Developer.com Guide to Building Intelligent Web Sites with JavaScript, Wiley Computer Publishing, NY, NY © 1998, pp. 65–86, 96–98, 101–102, 245–250 and 324–327.

Microsoft Computer Dictionary, 4$^{th}$ Edition, Microsoft Press, Redmond, WA,© 1999, p. 489.

U.S. Appl. No. 10/366,778, filed Feb. 14, 2003, Philip B. Griffin.

U.S. Appl. No. 10/367,190, filed Feb. 14, 2003, Philip B. Griffin.

(Continued)

*Primary Examiner*—Viet D. Vu
(74) *Attorney, Agent, or Firm*—Fliesler Meyer LLP

(57) ABSTRACT

A method for adaptively managing entitlements, comprising the steps of providing for the association of a role with a first resource; and providing for the association of a policy with a second resource, wherein the policy is based at least partially on the role; and providing for hierarchically relating the role and the policy; and wherein the role is hierarchically equal or superior to the policy.

28 Claims, 5 Drawing Sheets

U.S. PATENT DOCUMENTS

| | | | | |
|---|---|---|---|---|
| 6,029,182 | A | | 2/2000 | Nehab et al. ............... 715/523 |
| 6,058,392 | A | | 5/2000 | Sampson et al. |
| 6,141,010 | A | | 10/2000 | Hoyle ........................ 715/854 |
| 6,157,924 | A | | 12/2000 | Austin ......................... 707/10 |
| 6,161,139 | A | * | 12/2000 | Win et al. ................... 709/225 |
| 6,182,226 | B1 | | 1/2001 | Reid et al. .................. 713/201 |
| 6,226,745 | B1 | | 5/2001 | Wiederhold ................ 713/200 |
| 6,241,608 | B1 | | 6/2001 | Torango ...................... 463/27 |
| 6,260,050 | B1 | | 7/2001 | Yost et al. ............... 715/501.1 |
| 6,285,985 | B1 | | 9/2001 | Horstmann .................. 705/14 |
| 6,308,163 | B1 | * | 10/2001 | Du et al. ....................... 705/8 |
| 6,434,607 | B1 | * | 8/2002 | Haverstock et al. ........ 709/217 |
| 6,460,141 | B1 | * | 10/2002 | Olden ......................... 713/201 |
| 6,539,375 | B2 | | 3/2003 | Kawasaki ...................... 707/5 |
| 6,571,247 | B1 | * | 5/2003 | Danno et al. ............... 707/100 |
| 6,269,393 | B1 | | 7/2003 | Yost et al. ................... 709/201 |
| 6,587,849 | B1 | | 7/2003 | Mason et al. ................... 707/5 |
| 6,754,672 | B1 | | 6/2004 | McLauchlin ............. 707/104.1 |
| 2002/0069261 | A1 | | 6/2002 | Bellare et al. .............. 709/218 |
| 2002/0107913 | A1 | | 8/2002 | Rivera et al. ............... 709/203 |
| 2002/0111998 | A1 | | 8/2002 | Kim |
| 2002/0124053 | A1 | | 9/2002 | Adams et al. |
| 2002/0173971 | A1 | | 11/2002 | Stirpe et al. .................... 705/1 |
| 2003/0065721 | A1 | | 3/2003 | Roskind |
| 2003/0131113 | A1 | * | 7/2003 | Reeves et al. .............. 709/229 |
| 2003/0078972 | A1 | | 9/2003 | Tapissier et al. |
| 2003/0187956 | A1 | | 10/2003 | Belt et al. |
| 2003/0229623 | A1 | * | 12/2003 | Chang et al. .................. 707/3 |
| 2004/0003071 | A1 | | 1/2004 | Mathew et al. |
| 2004/0019650 | A1 | | 1/2004 | Auvenshine |
| 2004/0024812 | A1 | | 2/2004 | Park et al. |

OTHER PUBLICATIONS

U.S. Appl. No. 10/367,177, filed Feb. 14, 2003, Philip B. Griffin.

BEA WebLogic Server, *Assembling and Configuring Web Applications, BEA System, Relaease 7.0*, Revised: Aug. 20, 2002, 165 pages.

BEA WebLogic Server, *Introduction to WebLogic, BEA Systems, Release 7.0*, Document Date: Jun. 2002, Revised: Jun. 28, 2002, 22 pages.

An Introduction to BEA WebLogic Sever Security, The New Security Architecture of BEA WebLogic Server 7.0, *BEA Systems*, May 1, 2002. 20 pages.

BEA WebLogic Server, *Developing Security Providers for WebLogic Server, BEA Systems, Release 7.0*, Revised Aug. 30, 2002, 315 pages.

Eiji Okamoto, "Proposal for Integrated Security Systems", Jun. 1992, IEEE Computer Society Press, p.354–358.

http://java.sun.com/products/ejb/ (last visit: Dec. 7, 2004).

http://www.javaworld.com/jw–12–2002/jw–1207–yesnoejb_p.html (last visit: Dec. 7, 2004).

* cited by examiner

METHOD FOR ROLE AND RESOURCE POLICY MANAGEMENT

CROSS REFERENCES

This application is related to the following co-pending applications which are hereby incorporated by reference in their entirety: SYSTEM AND METHOD FOR HIERARCHICAL ROLE-BASED ENTITLEMENTS, U.S. application Ser. No. 10/367,177, Inventors: Philip B. Griffin, et al., filed on Feb. 14, 2003; METHOD FOR DELEGATED ADMINISTRATION, U.S. application Ser. No. 10/367,190, Inventors: Philip B. Griffin, et al., filed on Feb. 14, 2003; and METHOD FOR ROLE AND RESOURCE POLICY MANAGEMENT OPTIMIZATION, U.S. application Ser. No. 10/366,778, Inventor: Philip B. Griffin, filed on Feb. 14, 2003.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE DISCLOSURE

The present invention disclosure relates to authorization and control of resources in an enterprise application.

BACKGROUND

Enterprise applications can increase the availability of goods and services to customers inside and outside of an organization. One issue that accompanies deployment of an enterprise application is authorization or access control. Both customers and system administrators need to be privileged to perform certain actions (e.g., modifying a customer account) or to gain access to certain content. Typical authorization systems can be complex and time consuming to implement and maintain, especially if they are tied closely to the business logic in an enterprise application.

DETAILED DESCRIPTION

Figure 1:
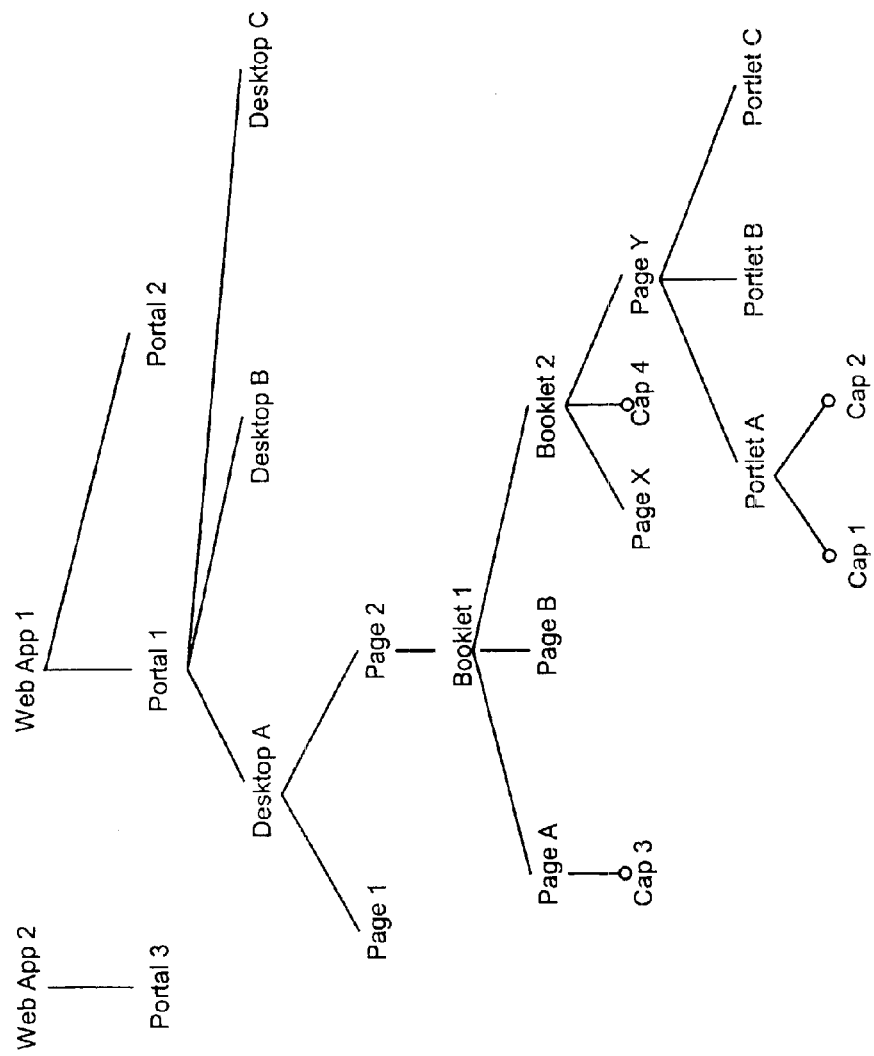
FIG. 1 is an illustration of a exemplary resource hierarchy in accordance to one embodiment of the invention.

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In one embodiment, an enterprise application includes one or more resources that facilitate the performance of business, scientific or other functions and tasks. In another embodiment, an enterprise application can be a Java™ 2 Enterprise Edition (J2EE) deployment unit that bundles together Web Applications, Enterprise Java™ Beans and Resource Adaptors into a single deployable unit. The Java™ programming language and its run-time libraries and environment are available from Sun Microsystems, Inc., of Santa Clara, Calif. Enterprise applications can include software, firmware and hardware elements. Software, firmware and hardware can be arbitrarily combined or divided into separate logical components. Furthermore, it will be apparent to those skilled in the art that such components, irregardless of how they are combined or divided, can execute on the same computer or can be arbitrarily distributed among different computers connected by one or more networks.

In one embodiment, a resource can correspond to any person, place or thing, including an object or an entity (e.g., a network, a computer, a computer user, a bank account, an electronic mail message, aspects of a computer operating system such as virtual memory, threads and file storage, etc.), a method or a process (e.g., balancing a checkbook, installing a device driver, allocating virtual memory, deleting a file, etc.), the occurrence or non-occurrence of an event (e.g., an attempt by a user to logon to a computer, a change in state, etc.) and an organization or association of resources (e.g., lists, trees, maps, hierarchies, etc.).

In one embodiment, resources can be classified into a hierarchical taxonomy (which itself can be a resource). By way of a non-limiting example, in an enterprise application, it may be necessary to refer to a particular resource such as a booklet. In order to reference the booklet, one needs to know which web page it is on, which portal the web page belongs to, which web application (or "web app") owns the web page, and which domain the web app belongs to. Each of these components is considered a resource and can be described as a resource path (e.g., a sequence of components separated by slashes):

domain/web_app/portal/desktop/page/booklet

The first resource is domain which lies at the "top" of the resource hierarchy. Working down the hierarchy, the next component is web_app. The web_app is a "child" or "descendent" of domain and domain is a "parent" of web_app. The domain is superior to web_app and web_app is inferior to domain. Likewise, portal is a child of web_app and a parent of desktop. The page is a child of desktop with booklet as its child. The depth of the resource is the number of components in its path. For example, the depth of booklet is six (assuming that we are counting from 1) and the depth of portal is three. In one embodiment, the depth of a resource can be unlimited. In one embodiment, a resource can have properties or capabilities. By way of a non-limiting example, a booklet resource could have the ability to be customized by an end-user. The capability could be appended to the hierarchy as follows:

domain/web_app/portal/desktop/page/booklet.customize

FIG. 1 is an illustration of an exemplary resource hierarchy in accordance to one embodiment of the invention. By way of a non-limiting example, this hierarchy can represent resources within an enterprise application. Web App 1 and Web App 2 are Web applications. A Web application resource is a part of an enterprise application that is accessible on the World Wide Web. Portal 1 and Portal 2 are portal resources and are children of Web App 1. Portal 3 is a child of Web App 2. In one embodiment, Web App 1 and Web App 2 can be children of one or more enterprise applications (not shown) which can be children of one or more domains (not shown). A portal is a point of access to data and applications that provides a unified and potentially personalized view of information and resources. Typically, a portal is implemented as one or more pages on a website (Page 1, Page 2, Page A, Page B, Page X, and Page Y). Portal pages can integrate many elements, such as applications, live data feeds, static information and multimedia presentations.

Desktop A, Desktop B and Desktop C contain one or more views of a portal that have been customized for a particular user or group of users. Pages within each desktop can contain portlets (Portlet A, Portlet B, and Portlet C) and booklets (Booklet 1 and Booklet 2). A portlet is a self-contained application that renders itself on a portal page. In one embodiment, a booklet is a collection of one or more pages or booklets. Resource Web App 1/Portal 1/Desktop A/Page 2/Booklet 1/Page A has a capability Cap 3. Likewise, Web App 1/Portal 1/Desktop A/Page 2/Booklet 1/Booklet 2 has a capability Cap 4 and Web App 1/Portal 1/Desktop A/Page 2/Booklet 1/Booklet 2/Page Y/Portlet A has capabilities Cap 1 and Cap 2.

Enterprise applications can control access to their resources and/or capabilities through the use of entitlements. In one embodiment, evaluation of an entitlement consists of determining a security policy by dynamically associating one or more roles with a principal. In one embodiment, a role can be based on rules that take into account information including knowledge about the principal, knowledge about a communication session, the current state of the system, and/or any other relevant information.

In one embodiment, a user represents a person who uses an enterprise application. A group can be an arbitrary collection of users. In one embodiment, members of a group share common traits such as job title, etc. A process can be a software or firmware computer program or portion thereof of any granularity (e.g., a task, thread, lightweight process, distributed object, Enterprise Java™ Bean, or any other computing operation). Users, groups and processes can be considered subjects. Subjects can be authenticated based on providing adequate proof (e.g., password, social security number, etc.) to an authentication system. Once authenticated, a subject can be considered a principal for purposes of evaluating entitlements. A principal is an identity assigned to a user, group or process as a result of authentication. A principal can also represent an anonymous user, group or process (e.g., a subject that has not been authenticated).

In one embodiment, a role definition contains one or more expressions that evaluate to true or false when evaluated for a given principal in a given context. In another embodiment, an expression can evaluate to a degree of certainty that access to a resource should be granted. Expressions may be nested within each other and can contain functions, arithmetic or logical operators, etc. In one embodiment, expressions are combined (e.g., with Boolean operators such as "and", "or", and "not") to form a Boolean expression that evaluates to true or false. If a role evaluates to true, then the principal in question is considered to satisfy the role.

Role expressions can be dynamically evaluated against a principal attempting to access a resource in a given context. A context can contain any information relevant to making a determination of whether a principal belongs in a role. By way of a non-limiting example, a context can include any of a principal's attributes (e.g., name, age, address, etc.) and/or information about a communication session. In another embodiment, a context can include information from a hypertext transfer protocol ("HTTP") or hypertext transfer protocol (secure) (HTTPS) request. This information can pertain to character encoding, remote user, authorization scheme, content length, server port, context path, request URI, request method, scheme, servlet path, content type, remote host, request protocol, locale, server name, remote address, query string, path information, etc. It will be apparent to those skilled in the art that a context can include any information which is relevant to evaluating an expression.

In one embodiment, expressions can include predicates. The invention disclosed herein is not limited to the present predicates discussed. A user predicate evaluates to true if the principal in question is the principal supplied as an argument to the predicate. The group predicate evaluates to true if the principal in question is a member of the specified group.

TABLE 1

Exemplary Roles

| ROLE | EXPRESSION |
|---|---|
| Anonymous | Satisfied by all principals |
| BankManager | (User = Donna) |
| CustomerService | (User = Michael or Peter) or (Group = BankTellers) |
| LoanOfficer | (Group = Associate) and (Group = TrainingLevel2) and not (User = Bob) |
| BankManager | (User = Donna) and ((10/14/02 <= currentDate <= 10/25/02) or (11/14/02 <= currentDate <= 11/25/02)) |
| Software | (Segment = JavaDeveloper) |
| SysAdmin | ((User = Donna) and ((10/14/02 <= currentDate <= 10/25/02) or (11/14/02 <= currentDate <= 11/25/02))) or (Segment = SystemAdministrator) |

Table 1 illustrates seven exemplary roles and their accompanying expressions. In one embodiment, the role "Anonymous" is a special role that is always satisfied. In another embodiment, the role of "Anonymous" is satisfied by an unauthenticated principal. The role of "BankManager" is met by a principal that is authenticated as user "Donna". The role of "CustomerService" is fulfilled by a principal authenticated as "Michael" or "Peter", or belonging to group "BankTellers". The "LoanOfficer" role is met by a principal that is a member of both the "Associate" group and the "TrainingLevel2" group, but is not "Bob". Roles can also be dynamic. By way of a non-limiting example, a role can be date and/or time dependent. In one embodiment, a time period can be specified using the currentDate predicate. The role of "BankManager" can be fulfilled by "Donna", but only between Oct. 14, 2002–Oct. 25, 2002 or Nov. 14, 2002–Nov. 25, 2002. It will be apparent to those skilled in the art that many such date or time predicates are possible (e.g., a predicate that is based on a date and a time, or one that is based on time only, etc.).

In addition to the predicates discussed above, a segment predicate (hereafter referred to as a "segment") can also be included in a role definition. A segment evaluates to true if the principal in question satisfies the segment's criteria. A segment can be defined in terms of one or more expressions or conditions which can be nested and include logical operators, mathematical operations, method calls, calls to external systems, function calls, etc. In another embodiment, a segment can be specified in plain language. By way of a non-limiting example:

When all of these conditions apply, the principal is a JavaDeveloper:
Developer is equal to True
Skill level is equal to 'High'
Preferred language is equal to 'Java'

In this example, the segment being described is "ExperiencedJavaDeveloper". The condition "Developer is equal to True" will evaluate to true when information contained in or referenced through a context indicates that the principal in question is a user in the software development department of an organization. Likewise, the other conditions ("Skill level is equal to 'High'", "Preferred language is equal to 'Java'") could similarly be evaluated using information from or referenced through a context. In another embodiment, a condition can pertain to information about a communication session. It will be apparent to those skilled in the art that a condition can be based on any information, whether the information is connected with a particular principal or not. If the segment as a whole evaluates to true, the principal is said to have satisfied the segment. In Table 1, by way of a non-limiting example, the role of "Software" is met by a principal that satisfies the "JavaDeveloper" segment. By way of a further non-limiting example:

When all of these conditions apply, the principal is a SystemAdministrator:
TimeofDay is between 12:00 am and 7:00 am
SystemLoad is 'Low'
AdminSkillLevel is at least 5

In this example, two conditions ("TimeofDay is between 12:00 am and 7:00 am" and "SystemLoad is 'Low'") are based on information unrelated to a particular principal. The segment evaluates to true for the principal in question if it is the middle of the night, the system is not busy, and the principal has level 5 administration skills. In Table 1, by way of a non-limiting example, the role of "SysAdmin" is met by "Donna", but only between Oct. 14, 2002–Oct. 25, 2002 or Nov. 14, 2002–Nov. 25, 2002, or by a principal that satisfies the "SystemAdministrator" segment.

In one embodiment, a segment can be persisted in Extensible Markup Language (XML). XML is a platform independent language for representing structured documents. Retrieving information stored in an XML document can be time consuming since the text comprising the XML document must be parsed. To save time, in another embodiment once a XML document representing a segment has been parsed, the information extracted therefrom can be cached to avoid the need to parse the file again.

Figure 2:
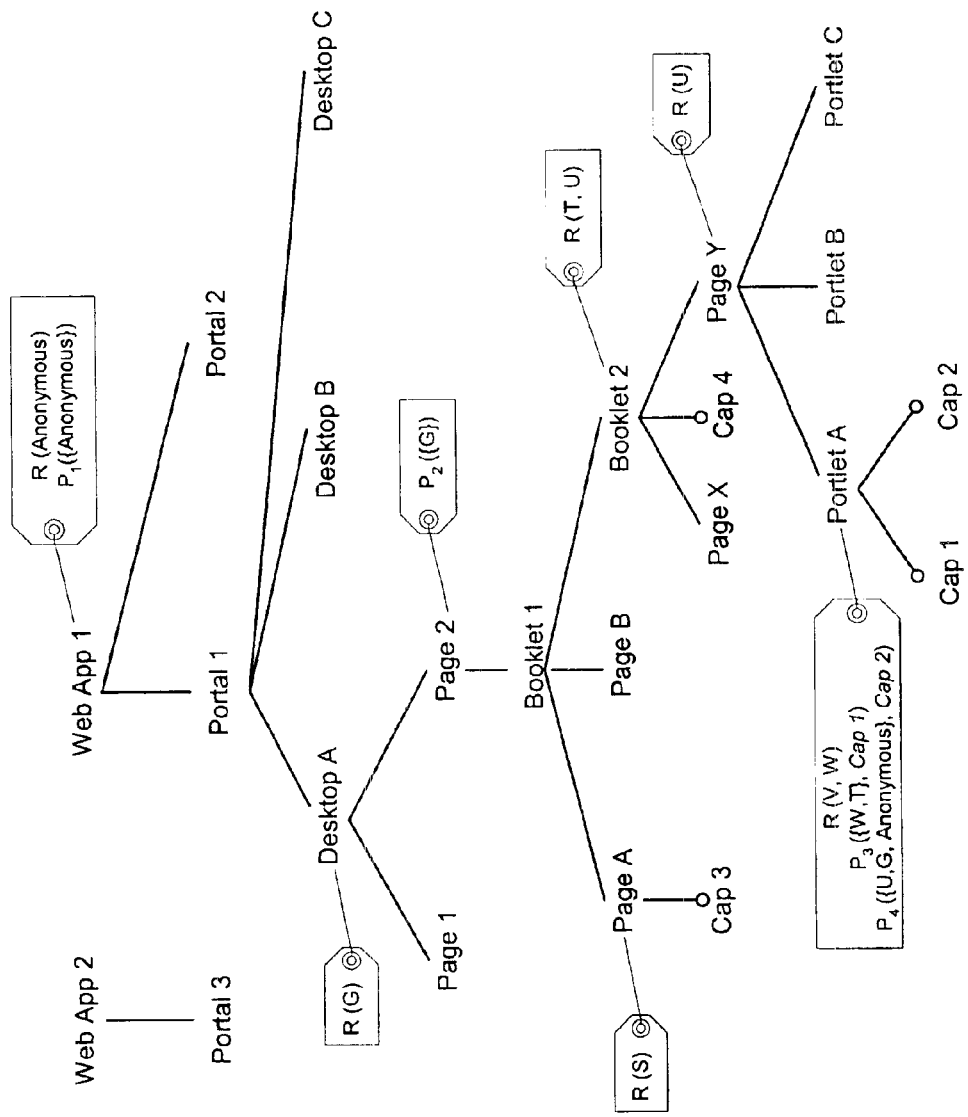
FIG. 2 is the exemplary hierarchy of FIG. 1 further illustrating roles and security policies.

FIG. 2 is the exemplary hierarchy of FIG. 1 further illustrating roles and security policies. Roles are designated by the letter 'R' followed by a parenthetical list of one or more roles. Likewise, policies are designated by the letter 'P' followed by a parenthetical list including a set of roles and an optional capability to which the policy applies. If no capability is present, the policy applies to the resource as a whole. In one embodiment, roles can be considered global in scope or can be associated with a particular resource. A global role is considered within the scope of any resource. In one embodiment, a role associated with a resource is within the scope of that resource. In another embodiment, the role is within the scope of the resource and all of its descendents. In yet another embodiment, the role is within the scope of the resource and all of its descendents unless a role with the same name is associated with a descendent. In this way, a "more local" role occludes a "less local" role of the name.

In FIG. 2, the role Anonymous is associated with the resource Web App 1. In one embodiment, Anonymous is within the scope of Web App 1 and all resources beneath it in the hierarchy. Role G is associated with resource Desktop A and as such, is within the scope of Desktop A and its descendents. Role S is associated with resource Page A. Since Page A has no children (i.e., the attribute Cap 3 does not count as a child), the scope of role S is limited to Page A. Resource Booklet 2 is associated with roles T and U. In one embodiment, role T is within the scope of Booklet 2 and all of its descendents but the same does not hold true for role U. Since a descendent of Booklet 2 (i.e., Page Y) is associated with another role by the same name, the role U associated with Booklet 2 is only within the scope of Booklet 2 and Page X. In one embodiment, the role U associated with Page Y however is within the scope of all of the descendents of Page Y (i.e., Portlet A, Portlet B, and Portlet C). Roles V and W are within the scope of Portlet A.

In one embodiment, a security policy (hereinafter referred to as a "policy") is an association between a resource, a set of roles, and an optional capability. Generally speaking, a policy grants access to the resource for all principals for which the set of roles evaluates to true. In one embodiment, a policy is satisfied if any of its roles evaluate to true for a given principal. In another embodiment, a policy is satisfied if all of its roles evaluate to true for a given principal. In another embodiment, a security policy integrity system can prevent removing or deleting roles that have policies which depend on them. Although one of skill in the art will recognize that there are many ways to implement such a system, one approach would be to keep track of the number of policies that depend on a particular role by using a reference count. Only when the reference count is equal to zero will the particular role be eligible for removal.

In yet a further embodiment, a policy's set of roles can be an expression including Boolean operators, set operators and roles for operands. A policy can be expressed as the tuple <resource, roles, [capability]>, wherein resource specifies the name of a resource and roles specifies a set of roles, and capability is an optional capability. While a policy is predicated on one or more roles, roles are predicated on users and groups. Therefore, one of skill in the art will appreciate that policies are in essence predicated on users, groups, and/or segments. By way of illustration, there are four policies illustrated in FIG. 2:

$P_1$ = <Web App 1, {Anonymous}>
$P_2$ = <Web App 1/Portal 1/Desktop A/Page 2, {G}>
$P_3$ = <Web App 1/.../Page Y/Portlet A, {W, T}, Cap 1>
$P_4$ = <Web App 1/.../Page Y/Portlet A, {U, G, Anonymous}, Cap 2>

By way of a non-limiting illustration, assume a principal p attempts to access resource Cap 1. In order to do so, the security policy $P_3$ on Cap 1 requires that p satisfy either role W or T. In one embodiment, all roles within the scope of Cap 1 (i.e., Anonymous, G, T, U, U, V, and W) are determined for p. If any of the roles that p satisfies match W or T, $P_3$ is likewise satisfied and access to Cap 1 is granted for p.

By way of a further non-limiting illustration, assume principal p attempts to access capability Cap 2 for resource Portlet A. In order to do so, the security policy $P_4$ on Cap 2 requires that p satisfy one of the roles U, G or Anonymous. In one embodiment, all roles within the scope of Portlet A (i.e., Anonymous, G, T, U, V and W) are determined for p. Note that in one embodiment, the role U associated with resource Booklet 2 is not in the scope of Portal A. Instead, the role having the same name but associated with the more "local" resource Page Y occludes it. Thus, if any of the roles that p satisfies match U, G or Anonymous, $P_4$ is satisfied and access to Cap 2 is granted for p. However, since in one embodiment every principal satisfies the role Anonymous, $P_4$ will always be satisfied.

By way of a further non-limiting example, assume p attempts to access capability Cap 4 associated with resource Booklet 2. This resource has no policy. In one embodiment, access will be denied. In another embodiment, access will be granted. In yet a further embodiment, access will be granted if p satisfies a policy in a parent resource of Booklet 2. Table 2 is a non-limiting illustration of a parent policy search using the resource hierarchy of FIG. 2. It is important to note, however, that the particular search order or the method of searching is irrelevant for purposes of this disclosure. In yet another embodiment, a resource without an explicit policy can include information regarding its parent policy and thus circumvent the need for a search.

TABLE 2

Exemplary Policy Search

| SEARCH STEP | CURRENT RESOURCE | CAPABILITY | POLICY FOUND? |
|---|---|---|---|
| 1 | Web App 1/Portal 1/Desktop A/Page 2/Booklet 1/Booklet 2 | Cap 4 | No |
| 2 | Web App 1/Portal 1/Desktop A/Page 2/Booklet 1/Booklet 2 | | No |
| 3 | Web App 1/Portal 1/Desktop A/Page 2/Booklet 1 | Cap 4 | No |
| 4 | Web App 1/Portal 1/Desktop A/Page 2/Booklet 1 | | No |
| 5 | Web App 1/Portal 1/Desktop A/Page 2 | Cap 4 | No |

TABLE 2-continued

Exemplary Policy Search

| SEARCH STEP | CURRENT RESOURCE | CAPABILITY | POLICY FOUND? |
|---|---|---|---|
| 6 | Web App 1/Portal 1/Desktop A/Page 2 | | Yes |

In one embodiment, the search for a policy proceeds as follows. The starting point for the search is the resource that owns the capability (i.e., Booklet 2) to which the principal is attempting to access (i.e., Cap 4). This is the current resource. If no policy exists at the current resource for the specific capability, in Step 2 we determine whether or not there is a policy merely on the resource itself. If no policy is found, in Step 3 the current resource is set equal to its parent (i.e., Booklet 1). If the current resource has no policy for Cap 4, we determine whether or not there is a policy on Booklet 1 itself. If no policy is found, in Step 5 the current resource is set equal to its parent (i.e., Page 2). If no policy is found for Cap 4 at the current resource, we determine in Step 6 whether or not there is a policy on Page 2 itself. Since this is the case, the search stops at Step 6. Web App 1/Portal 1/Desktop A/Page 2 has policy $P_2$. Therefore if p satisfies role G, access to Cap 4 is granted for p.

In another embodiment, capabilities are associated with particular resource types. For example, booklets may have a type of capability (e.g., Cap 4) that is not compatible with or available for other resource types (e.g., pages or desktops). Therefore, when searching for a policy as in Table 2, if a capability is not compatible for the current resource, that resource can be omitted from the search. In yet a further embodiment, if a policy is not found for a given resource type, a global library could be consulted to determine if there are any applicable global policies.

In another embodiment, roles and policies can reside in their own hierarchies, apart from the primary resource hierarchy. For applications that do not need to associate roles and/or policies with resources in the primary hierarchy, such an approach can allow for a shallow role and/or policy tree, perhaps only with a single level. Searching smaller hierarchies can potentially reduce the time it takes to find all roles within scope and locate a policy.

Figure 3:
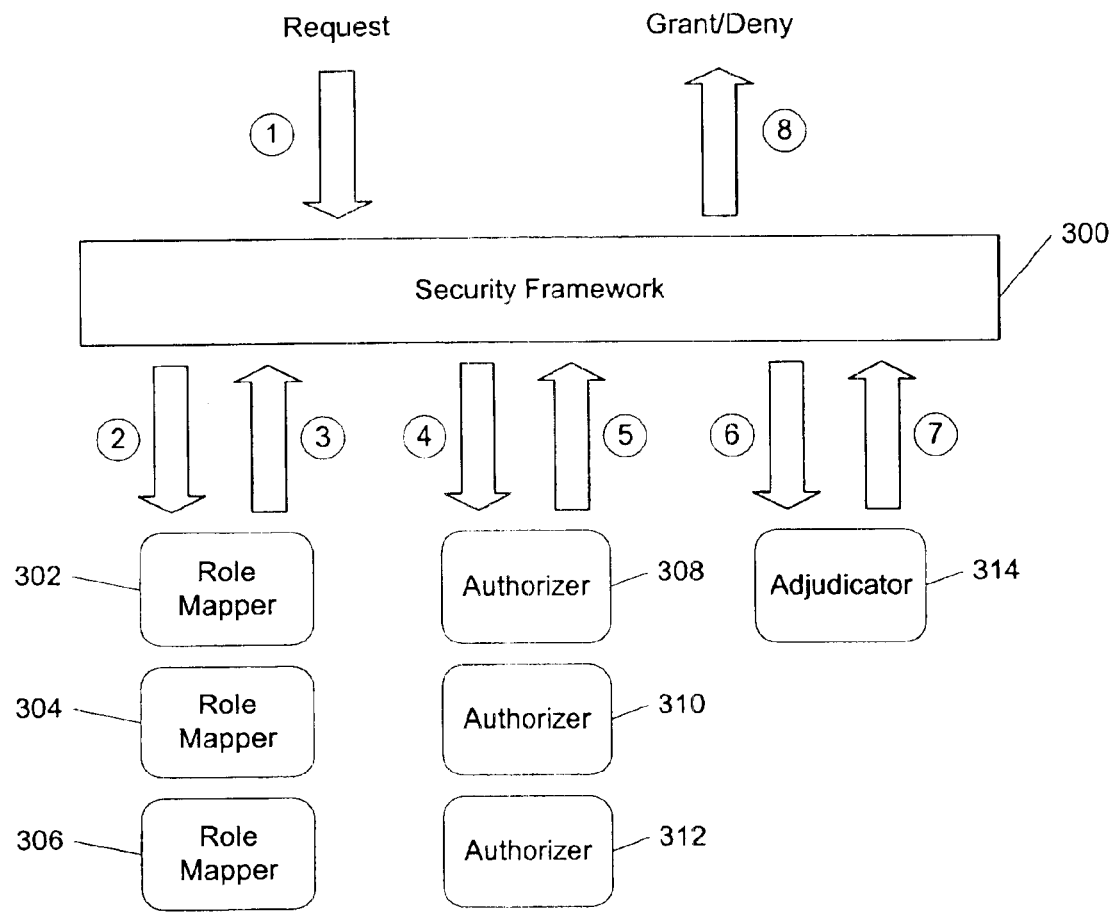
FIG. 3 is a diagram of an authorization system in accordance to one embodiment of the invention.

FIG. 3 is a diagram of an authorization system in accordance to one embodiment of the invention. Although this diagram depicts objects as functionally separate, such depiction is merely for illustrative purposes. It will be apparent to those skilled in the art that the objects portrayed in FIG. 3 can be arbitrarily combined or divided into separate software, firmware or hardware components. Furthermore, it will also be apparent to those skilled in the art that such components, irregardless of how they are combined or divided, can execute on the same computer or can be arbitrarily distributed among different computers connected by one or more networks.

In one embodiment, security framework 300 is a modular security architecture having a published interface that allows for plug-in components. By way of a non-limiting example, a framework can be a library, a set of interfaces, distributed objects, or any other means for software, firmware and/or hardware components to intercommunicate. Connected to the framework are one or more role mapper components (302–306). A role mapper maps (e.g., determines which roles are appropriate) a principal to one or more roles based on a resource hierarchy and a context. Each role mapper can implement its own specialized algorithms in this regard and use information and resources beyond that which is provided by the framework. Also connected to the framework are one or more authorizers (308–310). An authorizer is responsible for determining if access to a resource can be granted based on whether a principal satisfies a resource policy. Each authorizer can implement its own specialized algorithms in this regard and use information and resources beyond that which is provided by the framework. Finally, adjudicator 314 resolves any difference in outcome between authorization modules and returns a final result (e.g., "grant", "deny" or "abstain"). In one embodiment, the adjudicator can take the logical "or" of the final results such that if any result is a "grant", the outcome of adjudication is "grant". In another embodiment, the adjudicator can take the logical "and" of the final results such that if any result is a "deny", the outcome of adjudication is "deny". In yet a further embodiment, the adjudicator can use a weighted average or other statistical means to determine the final outcome.

A process can interact with the framework in a number of ways which will be apparent to those skilled in the art. In one embodiment, a calling process provides a resource access request ① to the framework 300. This request can include information about the principal, the resource to which access is requested, and any context information. In another embodiment, the request can contain references to this information. This information is then provided to one or more role mappers ② by the framework. Each role mapper determines which roles are appropriate for the principal based on their own criteria. In another embodiment, each role mapper can implement a cache to speed up searching for roles. Rather than traversing a resource tree to find all roles within scope, each role mapper can cache roles that were previously retrieved from a resource tree based on a key comprising the resource to which access is requested and the principal. After the initial retrieval from a resource tree, subsequent roles for a given resource-principal combination can be taken directly from the cache.

A set of satisfied roles is then returned to the framework in ③. The framework can provide the information from ① and ③ to the authorizer modules in ④. The authorization modules individually determine whether or not a policy is satisfied based on this information and their own criteria. In another embodiment, each authorizer can implement a cache to speed up searching for policies. Rather than traversing a resource tree to find a policy within scope, each authorizer can cache policies that were previously retrieved from a resource tree based on a key comprising the resource to which access is requested and the principal. After the initial retrieval from a resource tree, subsequent policies for a given resource-principal combination can be taken directly from the cache. The authorizer results (e.g., in terms of grant or deny decisions) are provided to the framework in ⑤ and provided to the adjudicator in ⑥. The adjudicator makes a final decision which it provides to the framework in ⑦. The framework then provides this decision to the calling process in ⑧.

As enterprise applications grow large and complex, so do the number of administrative tasks. One way to reduce the number of tasks that a system administrator is responsible for is to distribute the tasks among a number of administrators. Delegated administration allows a hierarchy of roles to manage administrative capabilities. By way of a non-limiting example, administrative capabilities can include the ability to manage customer accounts, the ability to delegate administrative capabilities, the ability to customize or personalize user interface elements (e.g., portals, booklets, desktops, portlets, etc.), the ability to perform administration of an enterprise application, etc. In another embodiment, any capability or property can be delegated. In one embodiment, delegation is an act whereby a principal in one role enables another hierarchically inferior role to have an administrative capability and/or further delegate an administrative capability. In one embodiment, a delegation role is identical to a role and can thusly be defined using predicates (e.g., user, group, currentDate, segment, etc.).

Figure 4:
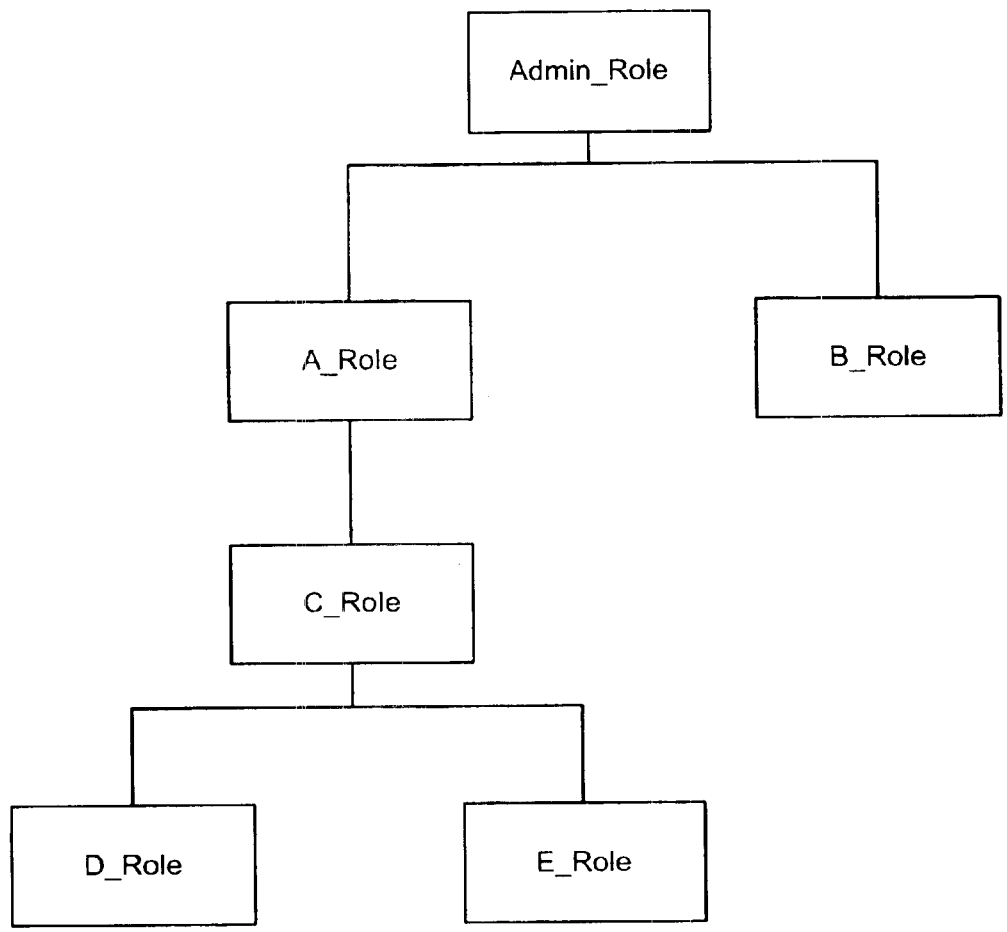
FIG. 4 is an illustration of a delegation role hierarchy in accordance to one embodiment of the invention.

FIG. 4 is an illustration of a delegation role hierarchy in accordance to one embodiment of the invention. In one embodiment, delegation roles can be organized into a delegation hierarchy to control the extent of delegation. In one embodiment, delegation roles can be associated with a single top-level resource, such as an enterprise application, and a delegation role hierarchy can be maintained separate from the resource hierarchy. A security policy can be associated with the enterprise application to limit which principals are allowed to alter the role definitions and the separately maintained role hierarchy. In another embodiment, a fictitious resource hierarchy that mirrors an arbitrary delegation role hierarchy can be utilized whereby each delegation role is associated with a resource corresponding to the delegation role's proper position in the hierarchy. A security policy can be associated with each resource to control which principals can modify the associated role. A security policy at the root of the hierarchy could limit which principals are allowed to modify the fictitious hierarchy itself.

Referring again to FIG. 4, role Admin_Role is at the top of the delegation role hierarchy. In one embodiment, the principal in this role has no limitations in its administrative capabilities or delegation authority. By way of a non-limiting example, a principal in the Admin_Role can modify the definition of delegation roles and the delegation hierarchy. In one embodiment, a principal in a delegation role can delegate administrative capabilities only to roles beneath it in a delegation hierarchy. Admin_Role has two children, A_Role and B_Role. A_Role has one child, C_Role, which as two children: D_Role and E_Role. By way of a non-limiting example, Admin_Role can delegate to all other roles beneath it in the hierarchy. Likewise, A_Role can delegate to C_Role, D_Role and E_Role. Whereas C_Role can only delegate to D_Role and E_Role. The leaves of the tree, D_Role, E_Role and B_Role cannot delegate since they have no children. In another embodiment, a node in the hierarchy can be related to more than one parent. This allows more than one superior role to delegate to an inferior role.

Figure 5:
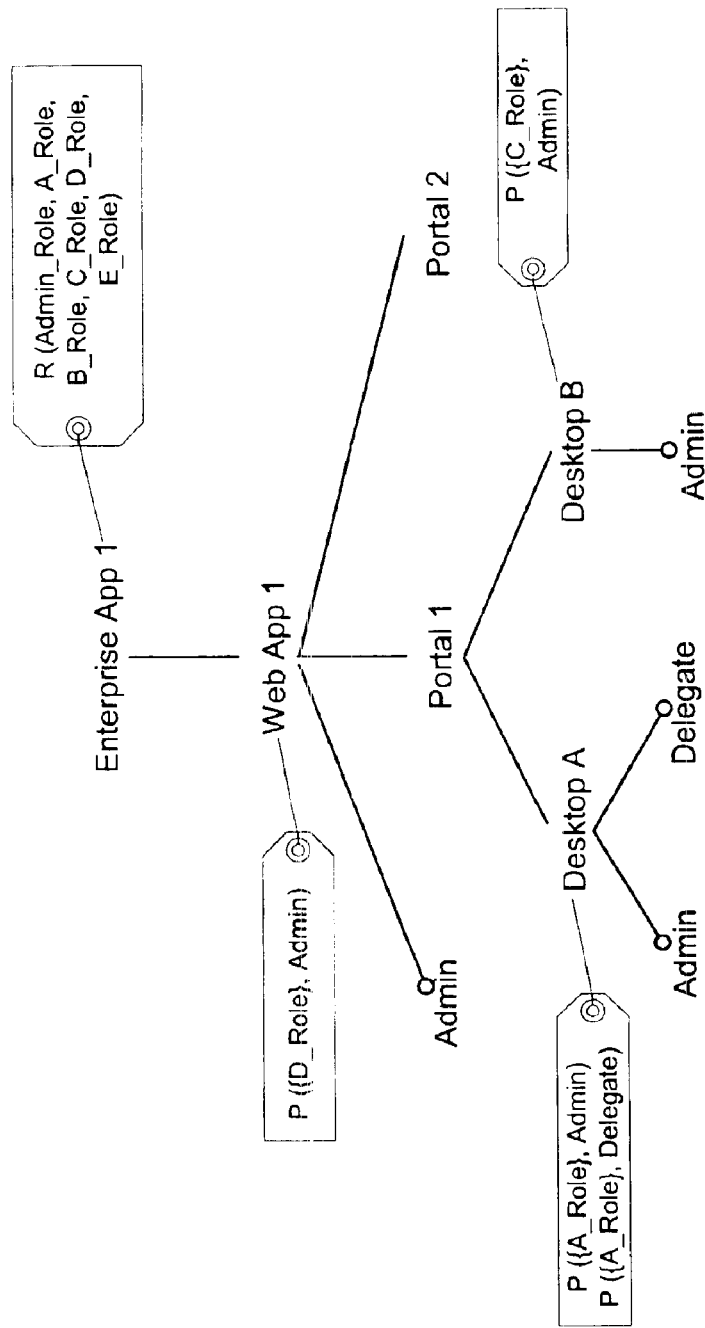
FIG. 5 is an illustration of exemplary delegation security policies in one embodiment of the invention.

In one embodiment, a delegation can be represented by a security policy. The policy is associated with a delegated resource/capability and is based on the role to which the resource/capability was delegated. FIG. 5 is an illustration of exemplary delegation security policies in one embodiment of the invention. Assume for this example that the delegation hierarchy of FIG. 4 holds. Notice that the root resource in FIG. 5, Enterprise App 1 is associated with the following roles: Admin_Role, A_Role, B_Role, C_Role, D_Role and E_Role. The hierarchy depicted in FIG. 5 could include other resources, roles and policies, but is limited for illustrative purposes. In one embodiment, a delegation creates a policy on the resource who's capability is being delegated. For example, resource Web App 1 has an Admin capability and an associated security policy P(D_Role). A principal in the role of C_Role, A_Role or Admin_Role created this policy by delegating to D_Role the Admin capability for Web App 1. (It will be apparent to those of skill in the art that any capability can be delegated; i.e., not just Admin.) Thus, principals that satisfy D_Role can perform administration of Web App 1. However, since Web App 1 does not have a delegation capability, a principal satisfying the D_Role cannot further delegate Web App 1 's Admin capability.

Resource Desktop A has two capabilities, Admin and Delegate, each of which has a policy. The policy P(A_Role) attached to both indicates that a principal in the role of Admin_Role delegated to Role_A the capability to both administer Desktop A and further delegate this capability. Thus, a principal in Role_A can further delegate both the Admin and Delegate capabilities to hierarchically inferior delegation roles (i.e., C_Role, D_Role and E_Role). For example, resource Desktop B has a capability Admin that has a policy P(C_Role). This policy was put in place by a principal in the role of A_Role or Admin_Role. A principal in the role of C_Role will be able to administer Desktop B, but will not be able to further delegate this capability.

In one embodiment, a delegation to a node that is already delegated to by a principal in a hierarchically superior delegation role is not permitted. Referring to FIGS. 4 and 5, and by way of a non-limiting illustration, if resource Portal 2 had a policy P(A_Role), a principal in the role of C_Role would not be able to delegate Portal 2 since it had been delegated to a role superior to C_Role (i.e., A_Role).

In another embodiment, aspects of user group administration can be delegated. By way of a non-limiting example, user groups can by organized into a hierarchy by viewing them as children of an enterprise application resource. Capabilities that can be delegated include: user profile administration, the ability to view the members of group, and the ability to create, update and remove users and groups.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a storage medium (media) having instructions stored thereon/in which can be used to program a computer to perform any of the features presented herein. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and user applications.

The foregoing description of the preferred embodiments of the present invention has been provided for the purposes of illustration and description. It is not intended to be exhaustive or to limit the invention to the precise forms disclosed. Many modifications and variations will be apparent to the practitioner skilled in the art. Embodiments were chosen and described in order to best describe the principles of the invention and its practical application, thereby enabling others skilled in the art to understand the invention, the various embodiments and with various modifications that are suited to the particular use contemplated. It is intended that the scope of the invention be defined by the following claims and their equivalents.

What is claimed is:

1. A method for managing entitlements in an enterprise application, comprising the steps of:

associating a role with a first enterprise application resource;

associating a policy with a second enterprise application resource, wherein the policy is based at least partially on the role;

mapping the role to a principal in order to determine whether or not the principal can access the second application resource;

wherein the first application resource is hierarchically related to the second application resource;

wherein the second application resource can inherit one or more roles associated with the first application resource;

wherein the role is hierarchically equal or superior to the policy;

the role can supersede a second role associated with a parent of the first application resource; and wherein the policy can supersede a second policy associated with a parent of the second application resource.

2. The method of claim 1 wherein:

the step of associating the policy with the second application resource is initiated by an authenticated user, group or process.

3. The method of claim 1 wherein the step of mapping the role further comprises:

evaluating the role to true or false for a principal in a context.

4. The method of claim 1 wherein:

the role is a Boolean expression that can include at least one of (1) another Boolean expression and (2) a predicate.

5. The method of claim 4 wherein:

the predicate is one of a user, group, time and segment.

6. The method of claim 4 wherein:

the predicate can be evaluated against the principal and a context.

7. The method of claim 4 wherein:

the predicate is specified in natural language.

8. The method of claim 1 wherein:

the policy is an association between the second resource and a set of roles.

9. A method for managing entitlements, comprising the steps of:

associating a first role with a first resource in a hierarchy of resources;

associating a first policy with a second resource in the hierarchy of resources, wherein the first policy is based at least partially on the first role;

wherein the second resource in the hierarchy of resources is capable of inheriting at least one role associated with the first resource in the hierarchy of resources;

wherein the first role can supersede a second role associated with a parent of the first resource; and wherein the first policy can supersede a second policy associated with a parent of the second resource.

10. The method of claim 9 wherein:

the step of associating the first policy with the second resource is initiated by an authenticated user, group or process.

11. The method of claim 9 including the step of:

mapping the first role to a principal in order to determine whether or not the principal can access the second resource.

12. The method of claim 9 including the step of:

evaluating the first role to true or false for a principal in a context.

13. The method of claim 9 wherein:

the first role is a Boolean expression that can include at least one of (1) another Boolean expression and (2) a predicate.

14. The method of claim 13 wherein:

the predicate is one of a user, group, time and segment.

15. The method of claim 13 wherein:

the predicate can be evaluated against a principal and a context.

16. The method of claim 15 wherein:

the predicate is specified in natural language.

17. The method of claim 9 wherein:

the first policy is an association between the second resource and a set of roles.

18. The method of claim 9 wherein:

the first resource and the second resource are part of an enterprise application.

19. A method for managing entitlements, comprising the steps of:

associating a role with a first resource in a hierarchy of resources;

associating a policy with a second resource in the hierarchy of resources, wherein the policy is based at least partially on the role; and wherein the second resource in the hierarchy of resources is capable of inheriting at least one role associated with the first resource in the hierarchy of resources;

wherein the second resource in the hierarchy of resources is capable of inheriting at least one policy associated with the first resource in the hierarchy of resources;

wherein the role can block a less local role; and wherein the policy can block a less local policy.

20. The method of claim 19 wherein:

the step of associating the policy with the second resource is initiated by an authenticated user, group or process.

21. The method of claim 19 including the step of:

mapping the role to a principal in order to specify whether or not the principal can access the second resource.

22. The method of claim 19 including the step of:

evaluating the role to true or false for a principal in a context.

23. The method of claim 19 wherein:

the role is a Boolean expression that can include at least one of (1) another Boolean expression and (2) a predicate.

24. The method of claim 23 wherein:

the predicate is one of a user, group, time and segment.

25. The method of claim 23 wherein:

the predicate can be evaluated against a principal and a context.

26. The method of claim 23 wherein:

the predicate is specified in natural language.

27. The method of claim 19 wherein:

the policy is an association between the second resource and a set of roles.

28. The method of claim 19 wherein:

the first resource and the second resource are part of an enterprise application.

* * * * *

UNITED STATES PATENT AND TRADEMARK OFFICE
CERTIFICATE OF CORRECTION

PATENT NO. : 6,917,975 B2
APPLICATION NO. : 10/367462
DATED : July 12, 2005
INVENTOR(S) : Phillip B. Griffin et al.

It is certified that error appears in the above-identified patent and that said Letters Patent is hereby corrected as shown below:

Title Page; Page 2; col. 2;

Item (56) – References Cited
In the "Other Publications" Section,

Delete "BEA WebLogic Server, Assembling and Configuring Web Applications, BEA System, Relaease 7.0, Revised: Aug. 20, 2002, 165 pages"

And insert

-- BEA WebLogic Server, Assembling and Configuring Web Applications, BEA Systems, Release 7.0, Revised: Aug. 20, 2002, 165 pages --

Signed and Sealed this

Fifth Day of May, 2009

JOHN DOLL
*Acting Director of the United States Patent and Trademark Office*